United States Patent [19]

Ebbert

[11] 4,129,316

[45] Dec. 12, 1978

[54] STEERABLE WHEEL VEHICLE SUSPENSION SYSTEM

[76] Inventor: LeRoy W. Ebbert, 20676 Fairmount Blvd., Shaker Heights, Ohio 44118

[21] Appl. No.: 830,798

[22] Filed: Sep. 6, 1977

[51] Int. Cl.² .............................................. B62D 7/08
[52] U.S. Cl. .................................... 280/96.1; 280/96.3
[58] Field of Search ...................... 280/660, 96.3, 96.1, 280/661

[56] References Cited

U.S. PATENT DOCUMENTS

| | | | |
|---|---|---|---|
| 698,522 | 4/1902 | Koehler | 180/96.1 X |
| 1,143,410 | 6/1915 | Lagergren | 180/96.1 X |
| 1,256,963 | 2/1918 | Weston, Jr. | 180/96.1 X |
| 1,268,933 | 6/1918 | Cox et al. | 280/96.1 |
| 1,982,377 | 11/1934 | Duby | 280/96.3 |
| 2,115,256 | 4/1938 | Eckenrode | 280/96.1 |
| 2,150,199 | 3/1939 | Weston | 280/96.3 X |
| 2,245,809 | 6/1941 | Olley | 267/57 |
| 2,256,366 | 9/1941 | Weston | 280/96.3 X |
| 2,631,867 | 3/1953 | Kost et al. | 280/96.3 |
| 3,096,994 | 7/1963 | Primeau et al. | 280/96.1 |
| 3,632,127 | 1/1972 | Grosseau | 280/96 |
| 3,827,711 | 8/1974 | Muller | 280/96.2 B |

Primary Examiner—Joseph F. Peters, Jr.
Assistant Examiner—Michael Mar
Attorney, Agent, or Firm—David A. Burge Co.

[57] ABSTRACT

A steering gear for a vehicle chassis provides first and second steerable wheels journaled on first and second spindle members. The chassis is provided with first and second yoke structures, each of which has an upper arm and a lower arm. The arms of each yoke encompass portions of a separate one of the spindle members. The arms of the first yoke define upper and lower king pin mounting locations which lie along a common first axis. The arms of the second yoke define upper and lower king pin mounting locations which lie along a common second axis. A first pair of king pins are positioned in the mounting locations defined by the arms of the first yoke, and pivotally mount the first spindle member on the first yoke. A second pair of king pins are positioned in the mounting locations defined by the arms of the second yoke, and pivotally mount the second spindle member on the second yoke. Each wheel has a rim which intersects and overhangs the common axis of its associated king pins sufficiently to locate the tread of its associated tire at a location intersecting and overhanging this axis. The mounting locations are arranged such that the first and second axes are inclined at equal degrees from the vertical, and such that the upper mounting location of each pair is positioned rearwardly with respect to the vehicle chassis from its associated lower mounting location. By this arrangement, the first and second axes are inclined forwardly and downwardly and cause the wheels to tilt into a turn to equal degrees to improve the turning characteristics of the vehicle.

2 Claims, 8 Drawing Figures

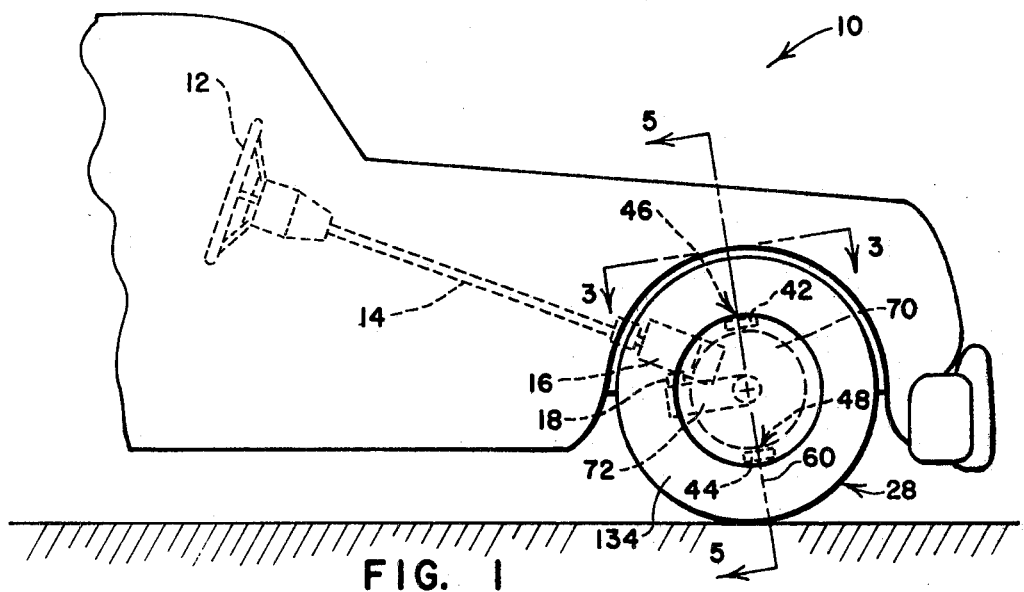
FIG. 1
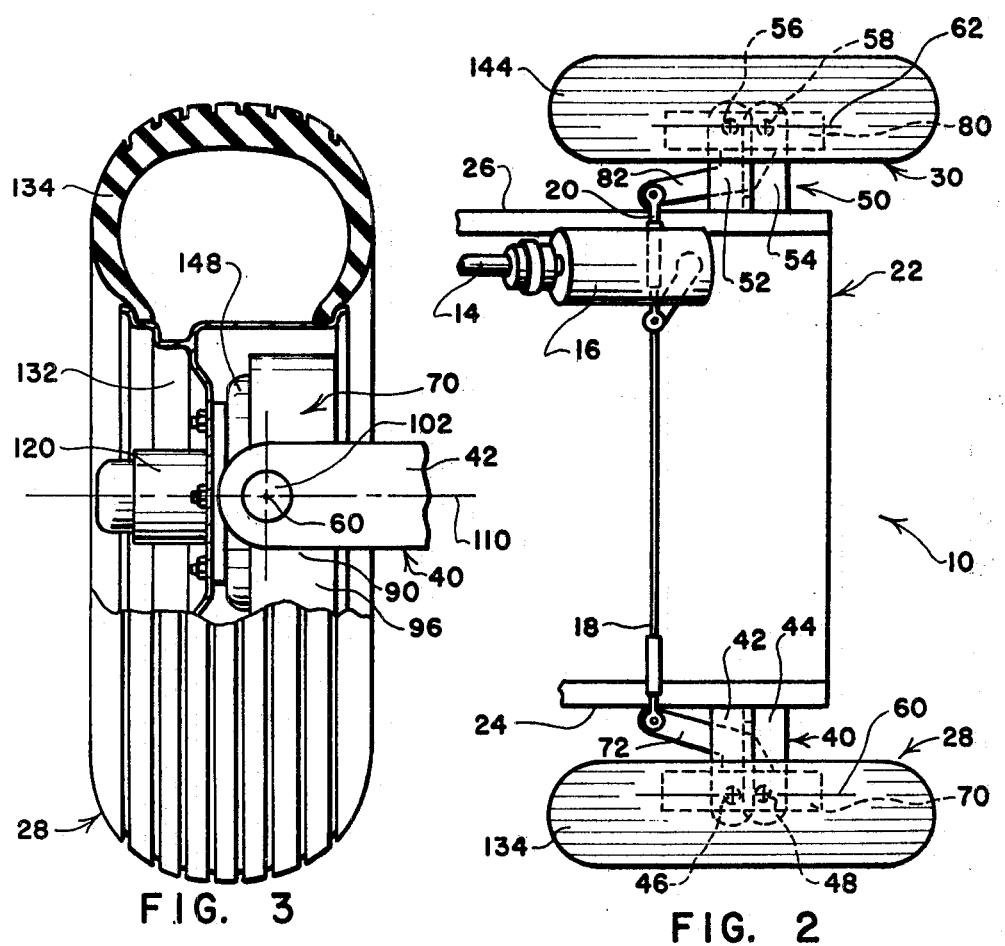
FIG. 3
FIG. 2

STEERABLE WHEEL VEHICLE SUSPENSION SYSTEM

BACKGROUND OF THE INVENTION

1. Field of the Invention

The present invention relates generally to suspension systems for steerable wheels of vehicles such as automobiles and other self-propelled and towed vehicles such as trucks, tractors, off-the-road vehicles, four-wheel trailers and the like.

2. Prior Art

Steering gear systems have been proposed which employ wheels journaled on stub axles with the stub axles supported pivotally on king pins having axes that tilt downwardly and forwardly such that the wheels are caused to tilt into a turn to equal degrees during steering of the wheels. Proposals of this type are described in Weston U.S. Pat. Nos. 2,150,199 and Kost et al., 2,631,867.

In some previous proposals, the front axle is in clevis form and receives a quill formed at the end of a wheel spindle to receive a king pin. The king pin is arranged with its axis tilting outwardly and downwardly from the center of the front axle. Connecting rods are provided for controlling the angular position of the wheel spindles from a steering wheel. Such arrangements have been proposed in order to provide a castering suspension for the steerable wheels with the objective of causing the wheels to return to a forward traveling position if the operator's hold on the steering wheel is released. A proposal of this type is described in Eckenrode U.S. Pat. No. 2,115,256.

In order to enhance driving safety, to render a vehicle more sure footed in its stance, to make the suspension system more effective in high speed turns, to obtain more nearly equal wear on tires, to eliminate sway on turns, and to keep the vehicle on an even keel, it is desirable to provide an arrangement in which the king pin axis intersects the tread of its associated tire and preferably intersects the area of contact between the tire and the road. In turning the vehicle, the wheel preferably pivots about an axis which intersects the area where the tire tread contacts the road, and, at the same time, tilts into the turn to enhance stability and performance. It is also desirable for purposes of strength and stability to support the wheel spindle of a steerable wheel at two locations spaced on opposite sides of the wheel rotation axis. Prior proposals have not recognized the desirability of this combination of features nor suggested its use.

SUMMARY OF THE INVENTION

The present invention overcomes various drawbacks of prior art proposals by providing a novel and improved, relatively low cost, sturdy, reliable and compact steerable wheel suspension system for vehicles. Necessity for camber and tow-in, or at least the degree of camber and tow which have heretofore been customary, is avoided so that the wheel suspension becomes sturdier and more reliable and has less need for front end realignment. The desired castering is obtained by utilizing a mounting wherein the king pin axes tilt downwardly and forwardly but lie in vertical planes extending in front to rear directions relative to the vehicle chassis. The king pin axes are located within a plane encompassed by the tread of their associated tires. This is accomplished by a novel wheel mounting structure which permits the wheel rims to overhang the locations of their respective king pins.

In a preferred embodiment of the invention, the steering gear includes a first structure on one side of the chassis defining a first pair of spaced upper and lower mounting locations aligned along a common first king pin axis, and a second structure on the other side of the chassis defining a second pair of spaced upper and lower mounting locations aligned along a common second king pin axis. The mounting locations are arranged such that the first and second king pin axes are inclined at equal degrees from the vertical, and such that the upper mounting location of each pair is positioned rearwardly with respect to the vehicle chassis from the associated lower mounting location. By this arrangement, the first and second king pin axes are inclined forwardly and downwardly.

First and second spindle members are positioned respectively between the mounting locations of the first and second structures. A first pair of king pins extends along the first king pin axis and pivotally connects the first spindle member to the first structure in the vicinities of the first pair of mounting locations. A second pair of king pins extends along the second king pin axis and pivotally connects the second spindle member to the second structure in the vicinities of the second pair of mounting locations.

The first and second spindle members respectively define first and second wheel rotation axes. The first wheel rotation axis extends perpendicular to the first king pin axis. The second wheel rotation axis extends perpendicular to the second king pin axis. First and second wheels are journaled respectively on the first and second spindle members and each has a tire mounted on a rim. The rim of the first wheel intersects and overhangs the first king pin axis sufficiently to locate the tread of its associated tire at a location intersecting and overhanging the first king pin axis. The rim of the second wheel intersects and overhangs the second king pin axis sufficiently to locate the tread of its associated tire at a location intersecting and overhanging the second king pin axis. A steering system is provided which interconnects the first and second spindle members for pivoting the spindle members in unison about the first and second king pin axes to steer the wheels. By this arrangement, when the spindle members are turned to steer the wheels, the inclined orientation of the first and second king pin axes causes the wheels to tilt into the turn to equal degrees.

In preferred practice, the first and second king pin axes extend in a common plane which is inclined from the vertical. Each of the king pin axes also extends in a separate vertical plane which parallels the forward-rearward dimension of the chassis.

In preferred practice, the chassis includes first and second yoke structures. The first yoke structure has a first pair of arms which define the first pair of mounting locations. The second yoke structure has a second pair of arms which define the second pair of mounting locations. Also, in preferred practice, each of the spindle members includes an upper portion located near the upper arm of the associated yoke structure, a lower portion located near the lower arm of the associated yoke structure, and a connecting portion extending between and connecting the upper and lower portions. A stub shaft is supported at a central location on the connecting portion between the upper and lower portions, and the associated wheel is journaled on the stub shaft. A suitable conventional brake system may be employed with the steerable wheels, as will be described in greater detail.

It is an object of the present invention to provide a novel and improved steerable wheel vehicle suspension system.

Other objects and a fuller understanding of the invention may be had by referring to the following description and claims taken in conjunction with the accompanying drawings.

BRIEF DESCRIPTION OF THE DRAWINGS

FIG. 1 is a fragmentary side elevational view of the front end of a vehicle chassis with a steerable wheel suspension system embodying principles of the present invention incorporated therein;

FIG. 2 is an enlarged, fragmentary top plan view of a portion of the vehicle chassis and suspension system;

FIG. 3 is an enlarged view with portions broken away and shown in cross section, the view being seen generally in the direction of arrows 3—3 in FIG. 1;

DESCRIPTION OF THE PREFERRED EMBODIMENT

Figure 4:
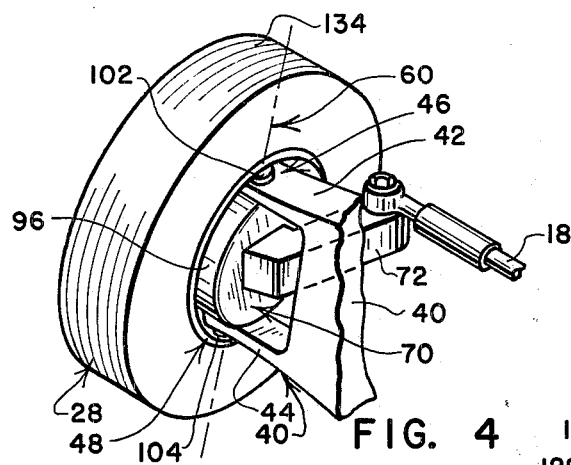
FIG. 4 is a perspective view of a portion of the steerable wheel suspension sytem utilized in the vehicle of FIG. 1.

Referring to FIG. 1, an automobile having a steerable wheel suspension system embodying principles of the present invention is indicated generally by the numeral 10. While the invention is depicted as being incorporated in an automobile, it will be understood that the principles of the invention may be employed in a wide variety of self-propelled and towed vehicles including trucks, tractors, off-the-road vehicles, four-wheel trailers and the like.

Referring to FIGS. 1 and 2, the automobile 10 has a conventional steering wheel 12 connected to a steering column 14. A conventional gearbox 16 is provided at the base of the steering column 14 for transversely moving a pair of connecting rods 18, 20 in unison.

Referring to FIG. 2, the automobile 10 has a chassis, indicated generally by the numeral 22. The chassis 22 has opposite sides 24, 26. A pair of steerable front wheels 28, 30 are provided near the front ends of the chassis sides 24, 26. A pair of non-steerable rear wheels (not shown) are provided near the rear ends of the chassis sides 24, 26, in a conventional manner.

In accordance with the preferred practice of the present invention, the chassis 22 is provided with first and second yoke structures 40, 50. The yoke structures 40, 50 have upper arms 42, 52, and lower arms 44, 54. The upper and lower arms 42, 44 of the yoke 40 define upper and lower king pin mounting locations, indicated generally by the numerals 46, 48. The upper and lower arms 52, 54 of the yoke 50 define upper and lower king pin mounting locations, indicated generally by the numerals 56, 58.

Figure 5:
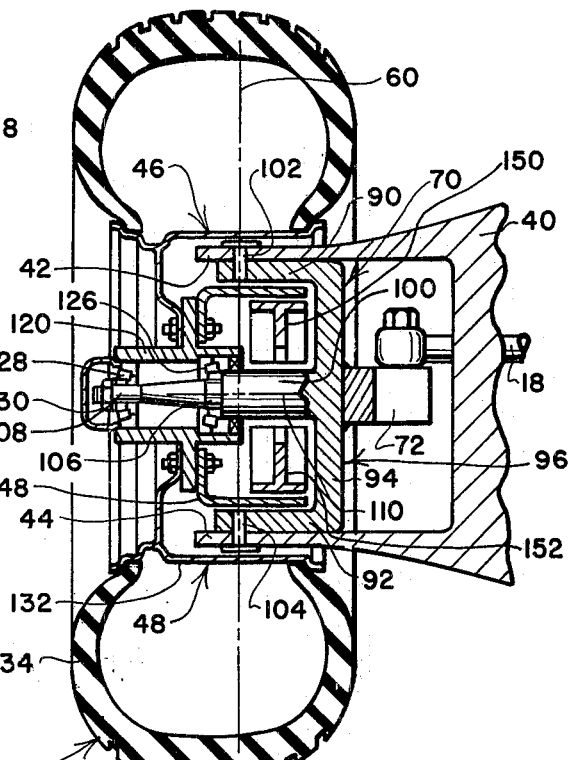
FIG. 5 is a sectional view as seen from a plane indicated by a line 5—5 in FIG. 1.
Figure 6:
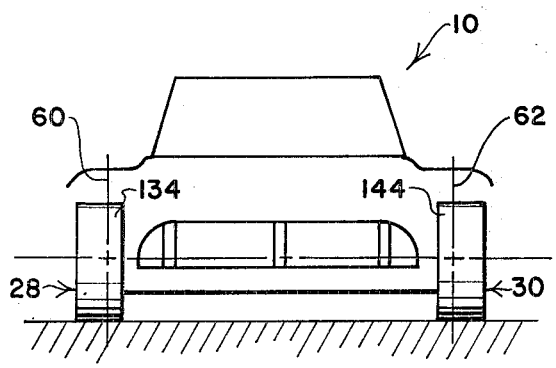
FIG. 6 is a diagramatic front elevational view of the vehicle of FIG. 1 with its front wheels oriented for straight ahead forward vehicle movement.
Figure 7:
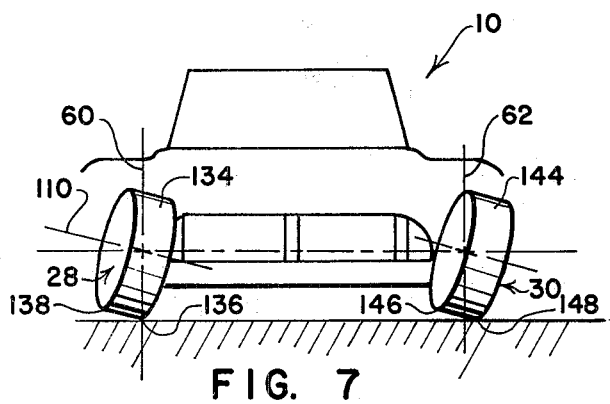
FIG. 7 is a view similar to FIG. 6 illustrating, in somewhat of an exaggerated fashion, the orientation of the front wheels during a left turn; and, FIG. 8 is a schematic view, similar to FIG. 5, illustrating the preferred positioning of a king pin axis.

The mounting locations 46, 48 lie along a common first axis 60, as seen in FIGS. 1, 2 and 4–7. Similarly, the mounting locations 56, 58 lie along a common second axis 62, as seen in FIGS. 2, 6 and 7. The axes 60, 62 are inclined from the vertical by equal degrees. In preferred practice, the axes 60, 62 lie in a common plane, indicated by the line 5—5 in FIG. 1, which extends transverse to the length of the vehicle 10 and which is preferably inclined from the vertical within the range of about 5 to 15°. An angle of 12° is most preferred. Moreover, in preferred practice, the axes 60, 62 lie in separate vertical planes which extend parallel to each other and which parallel the length of the vehicle 10. The axes 60, 62 may, accordingly, be described as tilting downwardly and forwardly with respect to the vehicle chassis 22.

As will be apparent as the description continues, the wheels 28, 30 pivot for steering purposes about the axes 60, 62. It is the forwardly, downwardly inclined orientation of these axes which cause the wheels 28, 30 to tilt into a turn. The sharper the turn, the greater the degree of tilting. Such an arrangement enhances vehicle stability and performance during turning.

Referring again to FIG. 2, first and second spindle members 70, 80 are positioned, respectively between the arms of the first and second yoke structures 40, 50. The spindle members 40, 50 have arms 72, 82 which drivingly connect with the connecting rods 18, 20 to enable the spindle members 70, 80 to be moved in unison to steer the wheels 28, 30. Since the spindle members 70, 80 are mirror images of each other, and since the spindle numbers 70, 80 are mounted in identical manners on their respective yoke structures 40, 50, only the spindle member 70 will be described.

Referring to FIGS. 3, 4 and 5, the spindle member 70 has an upper portion 90 located near the upper arm 42 of the yoke structure 40. The spindle member 70 also has a lower portion 92 located near the lower arm 44 of the yoke structure 40. A connecting portion 94 extends between and interconnects the upper and lower portions 90, 92. In preferred practice, the upper, lower and connecting portions 90, 92, 94 are formed integrally and may take the form of a drum 96 which opens in a direction facing toward the wheel 28.

A stub shaft 100 is supported at a central location on the connecting portion 94 intermediate the upper and lower portions 90, 92 and at a location intersecting the axis 60. A pair of king pins 102, 104 extend through aligned holes formed in the upper and lower portions 42, 44 and in the upper and lower arms 90, 92. The king pins 102, 104 are elongate and extend along the axis 60 whereby the king pins 102, 104 operate to mount the spindle member 70 on the yoke structure 40 for pivotal movement about the axis 60.

The stub shaft or spindle 100 is of conventional form and is provided with machined inner and outer cylindrical bearing mounting formations 106, 108 defining a common axis of wheel rotation, indicated by the numeral 110. The wheel rotation axis 110 intersects the king pin axis 60 at a location central to the mounting locations 46, 48.

The wheel 78 has a conventional hub 120. A pair of bearings 126, 128 are positioned on the bearing mounting formations 106, 108 and journal the hub 120 for rotation about the stub shaft or spindle 100. The outer end of the spindle 100 is threaded and a nut 130 is provided thereon to retain the hub 120 in place on the spindle 100.

The wheel 28 is bolted to the hub 120 in a conventional manner and includes a rim 132 which intersects and overhangs the king pin axis 60. By this arrangement, a tire 134 which is mounted on the rim 132 is caused to position its tread in intersecting relationship with the king pin axis 60. In preferred practice, the wheel 28 is configured such that the king pin axis 60 intersects substantially the center of the tire tread when the wheels 28, 30 are positioned to steer the vehicle 10 in forward and rearward, non-turning directions, as indicated schematically in FIG. 6.

By locating the king pin axes 60, 62 in planes which intersect the tread of their associated tires, inner and outer portions of the tire treads which engage a road surface as the vehicle 10 moves through a turn are caused to move relatively upwardly and downwardly, whereby the wheels 28, 30 tilt into the turn. The type of turning action which is achieved in this manner is illustrated schematically in FIG. 7.

Referring to FIG. 7, as the vehicle 10 turns to the left, an inner portion 136 of the tread of the tire 134 which is engaging a road surface is caused to move relatively downwardly with respect to the intersection of the axes 60, 110, while an outer portion 138 of the tread of the tire 134 which engages the road surface is caused to move relatively upwardly with respect to the intersection of the axes 60, 110. Similarly, the wheel 30 has a tire 144, and an inner portion 146 of the tread of the tire 144 is caused to move relatively upwardly while an outer portion 148 is caused to move relatively downwardly. An opposite type of tilting action is, of course, obtained when the vehicle turns to the right.

Referring again to FIG. 5, a feature of the invention lies in the ease with which it can be provided with a relatively conventional sort of braking system. For example, a brake drum 148 can be bolted to the hub 120, and a pair of brake shoes 150, 152 can be mounted in a conventional manner on the connecting portion 94 for movement into and out of braking engagement with the inner surface of the brake drum 148. A suitable conventional brake shoe actuation system (not shown), is, of course, provided to operate the brake shoes 150, 152. Alternatively, a conventional disc brake system may be employed. The type of brake system employed forms no part of the invention.

The location and orientation of the king pin axes 60, 62 is important to the preferred practice of the present invention. Since the axes 60, 62 are arranged symmetrically with respect to the centerplane of the chassis 22, the location and orientation of the axis 62 will be understood from a description of the location and orientation of the axis 60.

Figure 8:
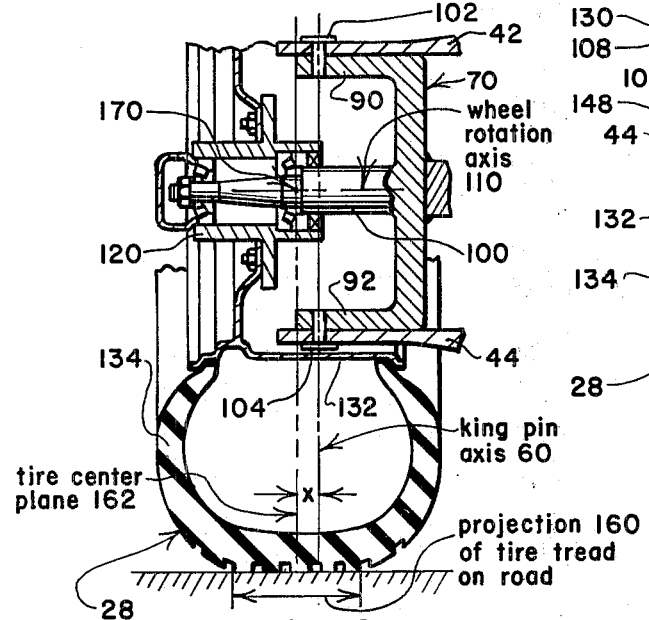

Referring to FIG. 8, the tire 134 can be said to have a "tread projection" onto a road surface, as indicated generally by the numeral 160. The tire 136 has a center plane 162 which extends radially of the wheel rotation axis 110 and divides the tire's tread into symmetrical halves. The tread projection 160 shifts inwardly, i.e. rightwardly with respect to the center plane 162, as viewed in FIG. 8 when the vehicle 10 executes a left turn of the type shown in FIG. 7. The tread projection 160 shifts outwardly, i.e. leftwardly with respect to the centerplane 162, as viewed in FIG. 8, when the vehicle 10 turns right. Since the tread projection 160 shifts inwardly during a left turn, the corresponding outward movement of the bottom of the tire 134 that results as the tire tilts into the turn helps to keep the area of road contact, i.e. the "tread projection" substantially along the king pin axis 60. A similar type of compensation is provided during right turns.

When the tire 134 is positioned for straight ahead vehicle movement, as depicted in FIG. 8, the tread projection 160 is bisected by the center plane 162. With the tire 134 positioned as shown in FIG. 8, the king pin axis 60 is positioned within the tread projection 160, and is preferably located slightly inwardly, by a distance "X", from the center plane 162. In preferred practice the distance "X" is about 20 percent of the tread projection width measured with the tire positioned as shown in FIG. 8.

An advantage which obtains by virtue of the slightly inward location from the center plane 162 of the king pin axis 60 is that, when the spindle member 70 pivots about the king pin axis 60 for a left turn, the center of the wheel 28, as indicated by a point 170 in FIG. 8, swings forwardly, projecting the wheel 28 somewhat forwardly from its normal location. At the same time, the wheel 30 is pivoted slightly rearwardly from its normal location. This relative forward and rearward wheel movement improves vehicle turning performance. A similar but opposite type of relative wheel movement results during a right turn.

The fact that the area of the tire tread which contacts a road surface shifts inwardly and outwardly with left and right turns permits the entire width of a tire tread to be utilized from side to side, and provides greater tire economy by distributing tire wear over the entire tread width.

Although the invention has been described in its preferred form with a certain degree of particularity, it is understood that the present disclosure of the preferred form has been made only by way of example and that numerous changes in the details of construction and the combination and arrangements of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. In combination with a vehicle chassis having forward and rearward ends and spaced sides, a steering gear comprising:
   (a) first structure on one side of the chassis defining a first pair of spaced upper and lower mounting locations aligned along a common first axis;
   (b) second structure on the other side of the chassis defining a second pair of spaced upper and lower mounting locations aligned along a common second axis;
   (c) the mounting locations being arranged such that the first and second axes are inclined at equal degrees from the vertical and such that the upper mounting location of each pair is positioned rearwardly with respect to the vehicle chassis from its associated lower mounting location, whereby the first and second axes defined by the mounting locations are inclined forwardly downwardly;
   (d) first and second spindle members positioned respectively between the mounting locations of the first and second structures;
   (e) a first pair of king pins extending along the first axis and pivotally connecting the first spindle member to the first structure in the vicinities of the first pair of mounting locations;

(f) a second pair of king pins extending along the second axis and pivotally connecting the second spindle member to the second structure in the vicinities of the second pair of mounting locations;

(g) the first and second spindle members, respectively, defining first and second wheel mounting axes, the first wheel mounting axis extending perpendicular to the first axis, and the second wheel mounting axis extending perpendicular to the second axis;

(h) first and second wheels journaled respectively on the first and second spindle members and each having a tire mounted on a rim;

(i) the rim of the first wheel intersecting and overhanging the first axis sufficiently to locate the tread of its associated tire at a location intersecting and overhanging the first axis;

(J) the rim of the second wheel intersecting and overhanging the second axis sufficiently to locate the tread of its associated tire at a location intersecting and overhanging the second axis;

(k) steering means interconnecting the first and second spindle members for pivoting the spindle members in unison about the first and second axes to steer the wheels;

(l) the first and second axes extending in a common plane inclined from the vertical, and each of these axes also extending in a separate vertical plane, the separate vertical planes being parallel and paralleling the forward-rearward dimension of the chassis;

(m) the chassis including first and second yoke structures, the first yoke structure having a pair of arms which define the first pair of mounting locations, and the second yoke structure having a second pair of arms which define the second pair of mounting locations;

(n) the spindle members each including an upper portion located near the upper arm of the associated yoke structure, a lower portion located near the lower arm of the associated yoke structure, and a connecting portion extending between and connecting the upper and lower portions, and a stub shaft supported at a central location on the connecting portion between the upper and lower portions, the associated wheel being journaled on the stub shaft;

(o) each of the tires having a center plane, and each of the king pin axes being located inwardly with respect to the chassis from the juncture of its associated tire center plane and its associated wheel rotation axis by a dimension of about 20 percent of the tread projection width of the associated tire;

(p) the king pin axes being inclined from the vertical within the range of about 5 to 15°; and, (q) whereby, when the spindle members are turned to steer the wheels, the inclined orientation of the first and second axes causes the wheels to tilt into the turn to equal degrees and the inward spacing of the king pin axes causes the center of one of the tires to swing forwardly while causing the center of the other of the tires to swing rearwardly to a desired degree to improve vehicle turning performance.

2. The combination of claim 1 wherein the king pin axes are inclined from the vertical at a most preferred angle of 12°.

* * * * *